Oct. 9, 1928.
C. GOSSMAN
BUMPER
Filed Feb. 20, 1928
1,687,287
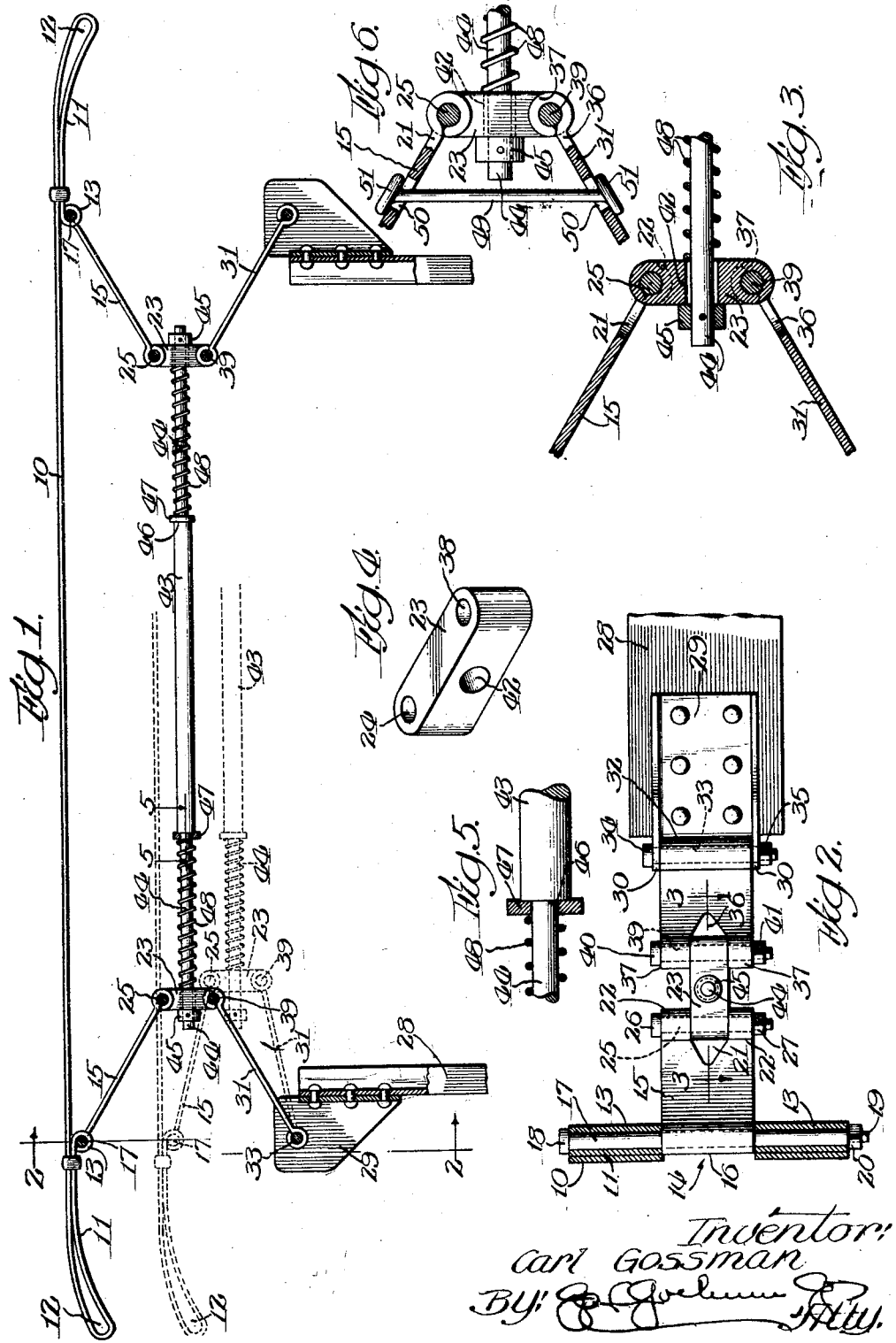
Inventor:
Carl Gossman Patented Oct. 9, 1928.

1,687,287

UNITED STATES PATENT OFFICE.

CARL GOSSMAN, OF GLENWOOD, ILLINOIS.

BUMPER.

Application filed February 20, 1928. Serial No. 255,643.

This invention relates to improvements in bumpers particularly adapted, though not necessarily limited in its use, in connection with automobiles, and one of the objects of the same is to provide a bumper of this character embodying improved resiliently yielding means to transmit the impact of shocks from external objects to the frame and in whatever direction the impact is received by the bumper bar.

A further object is to provide an improved bumper of this character which may be readily attached to any vehicle frame.

A further object is to generally improve and simplify the construction of bumpers of this character and to provide improved means for limiting the outward movement tendency of the bumper bar with respect to the vehicle frame.

To the attainment of these ends and the accomplishment of other new and useful objects as will appear, the invention consists in the features of novelty in substantially the construction, combination and arrangement of the several parts, hereinafter more fully described and claimed and shown in the accompanying drawing illustrating this invention, and in which Figure 1 is a top plan view, partly in horizontal section, of a bumper of this character constructed in accordance with the principles of this invention.

Figure 2 is a detail sectional view as taken on line 2—2, Figure 1.

Figure 3 is an enlarged detail view partly in plan and partly in horizontal section as taken on line 3—3, Figure 2.

Figure 4 is a detail perspective view of the pad or element to which the thrust bars or links are connected.

Figure 5 is an enlarged detail sectional view taken on line 5—5, Figure 1.

Figure 6 is a detail view partly in elevation, partly in section, of a modified form of the invention.

Referring more particularly to the drawing the numeral 10 designates an impact bar or member which may be constructed in any suitable manner, the ends 11 of the bar being bent back upon itself to form loops 12 at the extremities of the bumper. The inner extremities of the bent back portions 11 are shaped to form eyes or loops 13 and the looped extremities may be bifurcated as shown more clearly in Figure 2 to form a space 14 and into which spaces at each end of the bumper one end of a thrust rod or link 15 projects, the bar or link being provided with an eye 16 adapted to register with the eyes of the loops 13. A fastening pin or bolt 17 passes through the registering eyes to connect the thrust rods or links 15 with the bumper bar 10. If desired, the fastening bar 17 may be provided with a head 18 on one extremity while the other extremity is threaded as at 19 to receive a nut or collar 20 so that the thrust bar or rod will be pivotally connected to the extremities of the bent back portions 11.

The other end of the respective rods or links 15 are preferably bifurcated as at 21 (see particularly Figure 2) and are provided with eyes or loops 22 on opposite sides of the bifurcations.

A pad or element 23 is provided with an opening 24 therethrough adjacent one end thereof and this end of the pad is inserted into the bifurcation 21 so that the opening 24 will align with the eyes 22 to receive a fastening rod or bolt 25, the latter being preferably provided with a head 26 on one end and a nut or collar 27 threaded on the other end thereof.

Connected with the chassis 28 of the vehicle and on each side thereof is a bracket member 29 having spaced portions 30 provided with openings therethrough and between the spaced portions 30 one end of another thrust rod or link 31 is inserted, the rod or link 31 being provided with an eye 32 to register with the openings in the portions 30 of the bracket 29 so that a pin or bolt 33 may be passed through the registering openings to pivotally connect the rod or link 31 to the bracket 29. The fastening member 33 may be provided with a head 34 on one end and a nut or collar 35 threaded on to the other end. The other end of the rod or link 31 is bifurcated as at 36 to provide spaced eyes 37 and into the bifurcation 36 the other end of the pad or member 23 is adapted to be inserted so that an opening 38 in the end of the member 23 will register with the eyes 37. A pin or fastening member 39 is provided and passes through the registering openings for pivotally connecting the rod or link 31 and the pad or member 23 together. If desired the fastening device 39 may be provided with a head 40 on one end and the other end is threaded to receive a nut 41.

Both ends of the bumper bar 10 are similarly connected to the opposite sides of the chassis 28 of the vehicle, the connecting means embodying the thrust rods or links 15—31, and the pad or element 23 constitute a toggle joint structure.

The pads or members 23 are each provided with an opening 42 passing horizontally therethrough between the openings 24 and 38 and a rod or member 43 having its extremities reduced as at 44 is provided between the members 23. The reduced portions 44 of the member pass through the openings 42 in the respective members 23 and collars 45 are secured to the respective extremities of the portions 44 to prevent the rod or member 43 from disengaging the pads or members 23.

The reduced portions 44 of the rod 43 form shoulders 46 and if desired washers 47 may be sleeved upon the respective portions 44 to engage the respective shoulders 46. The shoulders 46 may be disposed at any desired distance from the respective extremities of the rod 43 and coil springs 48 are provided which encompass the respective reduced portions 44 and are disposed between the respective washers 47 and the adjacent pads or members 23. The stress of the springs 48 is such that they will normally hold the respective pads or members 23 against the collars 45.

With this improved construction it will be manifest that the normal tendency of the springs 48 is to separate the pads or members 23 and in so doing the bumper bar 10 will be projected forwardly beyond the front of the chassis 28 and when the bar receives an impact, no matter from whatever direction, the bumper bar 10 will be forced inwardly toward the end of the vehicle, during which movement the tendency of the pads or members 23, assuming the impact to be substantially central of the bumper bar 10, will be forced towards each other by reason of the thrust bars or links 15 and 31, and is indicated in dotted lines in Figure 1. These springs 48 together with the thrust bars or links 15 and 31 and the pads or members 23 provide a resiliently yielding means to resist the inward movement of the bumper bar 10.

This operation will be performed and the springs 48 will resiliently resist the movement of the bumper bar inwardly no matter from what angle or from what point on the bumper bar the impact is transmitted to the springs. As soon as the impact is relieved, the springs 48 through the medium of the thrust bars or links 15—31 will restore the bumper bar to its original or normal position.

If it is desired to provide additional means to limit the movement of the bumper bar forwardly or away from the front of the vehicle frame, stop devices 49 may be provided and these stop devices may embody a bar or rod the ends of which pass through openings 50 in the thrust rods or links 15—31 and is provided with heads 51 on the extremities of the rods so that the thrust rods or links 15 and 31 will be free for movement in directions towards each other, and the heads 51 on the rod 49 will limit the outward separating movement of the thrust rods or links 15 and 31 with respect to each other.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A bumper for vehicles including an impact bar extending in a direction across the vehicle, a pair of pads, links individual to the pads and pivotally connected by one end to the respective pads, means pivotally connecting one end of one of the links of each pad to the impact bar, means pivotally connecting the other link of the respective pads to the vehicle frame whereby when the impact bar is moved towards the vehicle the said pads will be moved towards each other, and means for yieldingly resisting the last said movement of said pads.

2. A bumper for vehicles including an impact bar extending in a direction across the vehicle, a pair of toggle joints, means pivotally connecting the ends of the toggle bars respectively to the bumper and the vehicle frame, whereby an impact upon the bumper bar will knuckle the toggles, and means operating upon the knees of said toggles to yieldingly resist the knuckling of said toggles.

3. A bumper for vehicles including an impact bar extending in a direction across the vehicle, a pair of toggle joints, means pivotally connecting the ends of the toggle bars respectively to the bumper and the vehicle frame, whereby an impact upon the bumper bar will knuckle the toggles, a bar loosely connecting the knees of the toggles, and resilient means carried by said bar and operable upon the knees of the toggles to yieldingly resist the knuckling of the toggles.

4. A bumper for vehicles including an impact bar extending in a direction across the vehicle, a pair of pads, links individual to the pads and pivotally connected by one end to the respective pads, means pivotally connecting one end of one of the links of each pad to the impact bar, means pivotally connecting the other link of the respective pads to the vehicle frame whereby when the impact bar is moved towards the vehicle the said pads will be moved towards each other, means for yieldingly resisting the last said movement of said pads, and means for limiting the separating movement of the toggle members.

5. A bumper for vehicles including an impact bar extending in a direction across the vehicle, a pair of toggle joints, means pivotally connecting the ends of the toggle bars respectively to the bumper and the vehicle frame, whereby an impact upon the bumper bar will knuckle the toggles, means operating upon the knees of said toggles to yieldingly resist the knuckling of said toggles, and means for limiting the separating movement of the toggle bars.

6. A bumper embodying an impact bar, a pair of toggles, means pivotally connecting the free ends of the respective toggle bars respectively to the impact bar and the vehicle, the knee of each of said toggles being formed by a pad member, a rod loosely passing through said members, and resilient means mounted upon the rod and operating upon the knees of the toggles to yieldingly resist the knuckling of said toggles.

7. A bumper embodying an impact bar, a pair of toggles, means pivotally connecting the free ends of the respective toggle bars respectively to the impact bar and the vehicle, the knee of each of said toggles being formed by a pad member, a rod loosely passing through said members, resilient means mounted upon the rod and operating upon the knees of the toggles to yieldingly resist the knuckling of said toggles, a rod passing loosely through the toggle bars remote from said pad, and formations on the extremities of the said rod for limiting the separating movement of the toggle bars.

8. A bumper embodying an impact bar, the ends of the bar being bent back upon itself, eyes formed in the extremities of said bent back portions, a pair of toggles, means pivotally connecting the free end of one of each pair of the toggle bars respectively with the eyes on said impact bar, means pivotally connecting the free end of the other bar of the respective toggles with the vehicle, and resilient means operating upon the knees of the toggles for yieldingly resisting the folding movements of the toggles.

9. A bumper embodying an impact bar, the ends of the bar being bent back upon itself, eyes formed in the extremities of said bent back portions, a pair of toggles, means pivotally connecting the free end of one of each pair of the toggle bars respectively with the eyes on said impact bar, means pivotally connecting the free end of the other bar of the respective toggles with the vehicle, a bar loosely passing through the knees of the toggles, formations on the end of the bars, to prevent disengagement of the last said bar from the toggles, shoulders on the last said bar on the other side of the toggles, and resilient means encompassing the bars, one end of the respective resilient means engaging the respective shoulder on the last said bars and the other ends of the respective resilient means operating against the knees of the respective toggles for yieldingly resisting the knuckling of the toggles.

In testimony whereof I have signed my name to this specification, on this 14th day of February, A. D. 1928.

CARL GOSSMAN.